United States Patent
Simic (10) Patent No.: US 7,527,234 B2
(45) Date of Patent: May 5, 2009

(54) DYNAMIC MOUSE TRAY

(76) Inventor: Mark Simic, 882 Homer Avenue, Toronto, ON (CA) M6W 2C5

( * ) Notice: Subject to any disclaimer, the term of this patent is extended or adjusted under 35 U.S.C. 154(b) by 7 days.

(21) Appl. No.: 11/623,527

(22) Filed: Jan. 16, 2007

(65) Prior Publication Data

US 2007/0176073 A1 Aug. 2, 2007

(30) Foreign Application Priority Data

Jan. 30, 2006 (CA) .................................. 2534736

(51) Int. Cl.
*A47G 29/00* (2006.01)
*B43L 15/00* (2006.01)
(52) U.S. Cl. .................. 248/372.1; 248/118.1; 248/918
(58) Field of Classification Search .............. 248/372.1, 248/371, 393, 394, 395, 396, 618, 619, 620, 248/918, 118.1, 346.01
See application file for complete search history.

(56) References Cited

U.S. PATENT DOCUMENTS

| | | | |
|---|---|---|---|
| 3,419,238 A * | 12/1968 | Flory | 248/163.1 |
| 3,879,112 A * | 4/1975 | Hickey | 359/874 |
| 4,069,995 A * | 1/1978 | Miller | 248/118.1 |
| 4,157,861 A * | 6/1979 | Davies | 359/225 |
| 5,636,822 A * | 6/1997 | Hendershot et al. | 248/346.01 |
| 5,730,408 A * | 3/1998 | McAllister et al. | 248/288.51 |
| 5,771,990 A * | 6/1998 | Liang | 181/208 |
| 5,826,842 A * | 10/1998 | Paulse et al. | 248/118.1 |
| 6,526,896 B2 * | 3/2003 | Woronecki et al. | 108/95 |
| 6,592,085 B2 * | 7/2003 | Iwata et al. | 248/118.1 |
| 6,726,158 B2 * | 4/2004 | Issa | 248/118.1 |

* cited by examiner

*Primary Examiner*—Anita M King
(74) *Attorney, Agent, or Firm*—Law Offices of Albert Wal-Kit Chan, PLLC (57) ABSTRACT

A mouse tray apparatus includes a substantially planar mouse tray pivotally mounted at a bottom mid-portion thereof to a base such that as an operator moves a mouse over a top surface of the mouse tray, a weight of the operator's hand on the mouse causes the tray to tilt downward in a direction corresponding to a location of the mouse on the mouse tray. A bias force can be provided to resists tilting of the mouse tray away from a horizontal position, so that as the operator moves a mouse over a top surface of the mouse tray, a weight of the operator's hand on the mouse overcomes the bias force and causes the mouse tray to tilt.

18 Claims, 9 Drawing Sheets

DYNAMIC MOUSE TRAY

This application claims priority of Canadian Application No. 2,534,736, Filed Jan. 30, 2006, the entire disclosure of which is incorporated by reference herein in its entirety.

This invention relates to ergonomic components for use with a computer mouse or other input device and more particularly to an ergonomic tray that continuously tilts while being operated to provide continuous motion of the wrist in varying directions depending on the position of the hand on the tray.

BACKGROUND

A mouse provides a means for producing a two dimensional displacement signal that is used to control the position of a screen cursor as needed to highlight, move or select icons, text or the like, as well as for drawing and other uses. A typical mouse provides the signal by moving over a surface or mouse pad and has one or more pushbuttons.

The use of a computer mouse is prevalent in the workplace, however, extended operation of a computer mouse can be hazardous to the user. Typically, the user operates the mouse by moving his or her arm with the wrist in one constant position either bent or inline with the forearm with very little or no movement of the wrist, which can cause the tendons and muscles in the wrist and forearm to become strained or stiff, often resulting in discomfort. In addition, the lack of movement in the wrist decreases blood flow to the wrist and forearm, further resulting in negative impacts on the body.

Tilt adjustable mouse trays are known. Some mouse trays are capable of tilting in one direction, some tilting forward and rearward and others tilting left and right, while other mouse trays tilt in all directions relative to a fixed point. These mouse trays do not continuously tilt while in use, but remain in a fixed position. Usually, mouse trays that tilt forward and rearward are attached to a keyboard platform and the purpose of tilting the mouse tray is to ensure that it remains horizontal when the keyboard platform has been tilted forward or rearward. Another purpose of mouse trays that tilt in one direction either forward and rearward or left and right or mouse trays that tilt in all directions is to allow the user to adjust the tray to a tilt angle that is most comfortable for them.

The problem with the mouse trays mentioned above is that when in use the trays remain in one position. People often do not make any adjustments to the mouse tray while others do make an initial adjustment before the first use, but after the adjustment is made, the tilt of the mouse tray remains the same and never changes during the operation of the mouse. Although it is not typically done, it is possible for people to adjust the mouse trays periodically to vary the position of their wrist. The mouse trays that tilt only in one direction have a limited amount of variation, while the mouse trays that can be tilted in all directions offer a greater range of motion, but in all previous trays, from the time the tilt is adjusted until the subsequent time it is adjusted, the mouse tray remains in the same position. What is needed is a mouse tray that continuously tilts, providing constant motion for the wrist and forearm.

SUMMARY OF THE INVENTION

It is an object of the present invention to provide a mouse tray that overcomes problems in the prior art.

In a first embodiment the present invention provides mouse tray apparatus comprising a substantially planar mouse tray pivotally mounted at a bottom mid-portion thereof to a base, and at least one bias element operative to exert a bias force that resists tilting of the mouse tray away from a substantially horizontal neutral position. The bias force is such that as an operator moves a mouse over a top surface of the mouse tray, a weight of the operator's hand on the mouse overcomes the bias force and causes the mouse tray to tilt downward in a direction corresponding to a location of the mouse on the mouse tray.

In a second embodiment the present invention provides a mouse tray apparatus comprising a substantially planar mouse tray pivotally mounted at a bottom mid-portion thereof to a base such that as an operator moves a mouse over a top surface of the mouse tray, a weight of the operator's hand on the mouse causes the tray to tilt downward in a direction corresponding to a location of the mouse on the mouse tray.

The present invention allows the user's wrist to be in continuous motion in all directions while using a mouse or other similar input device. In this disclosure, all such input devices will be generally termed a mouse.

The present invention consists of a tray that is conveniently and typically horizontal when not in use to prevent the mouse from sliding off the tray. The tray rests on an upward protruding member that is attached to a base below the tray, the tray tilts in all directions relative to the fixed point resting on the protruding member, in the preferred embodiment, the fixed point is the center of a circular tray, thereby providing an equal allowance of tilt on all sides of the tray. The present invention also has bias devices to anchor the tray; in the preferred embodiment, metal springs are used as the bias device because of their durability and longevity. The bias devices are in constant tension and are placed around the fixed point of the tray, keeping the mouse tray horizontal. Thus the mouse tray is biased into a horizontal orientation above the base.

When the user's hand is placed on the mouse, the weight of the hand causes the adjacent section of the tray to tilt downwardly, but the bias devices have enough tension to prevent the edge of the tray from tilting too far and coming in contact with the base. When the mouse is slid over the fixed center point or the hand is lifted off the mouse, the tray returns to the horizontal position. So the tray tilts in all directions relative to the fixed point, depending on where the hand and mouse is positioned, thereby providing continuous movement, as well as numerous degrees and axes of tilt.

The constant tilting of the tray causes the wrist to continually be in motion, thereby exercising the various ranges and directions of the wrist, reducing injuries related to stiffness and lack of movement. The constant movement of the muscles and tendons also promotes circulation in the wrist and hand.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

FIGS. 1-9 illustrate an embodiment of a mouse tray apparatus 10 of the present invention. The apparatus 10 comprises a substantially planar mouse tray 40 pivotally mounted at a bottom mid-portion thereof to a base 30 such that as an operator moves a mouse over a top surface of the mouse tray 40, a weight of the operator's hand on the mouse causes the tray 40 to tilt downward in a direction corresponding to a location of the mouse on the mouse tray 40.

The base 30 of the illustrated apparatus 10 comprises a pylon 32 extending upward from a base plate 20, and a top end of the pylon 32 pivotally engages the bottom of the mouse tray 40 at a location substantially in a center of the mouse tray 40. Thus it can be seen that the weight of the operators hand on the mouse will tilt the mouse tray 40 down, depending on where the hand and mouse are located.

While it is contemplated that this movement of the tray 40 alone will provide the desired variation in hand and wrist position during use of the mouse, it is preferred to bias the mouse tray 40 toward a substantially horizontal neutral position, such that there is a counteracting force opposing downward movement caused by the weight of the operator's hand. The bias force is calculated such that as an operator moves a mouse over a top surface of the mouse tray, a weight of the operator's hand on the mouse overcomes the bias force and causes the mouse tray to tilt. With such a bias force being exerted the mouse tray 40 will move more smoothly and also will be neatly oriented in the neutral position when not in use. Typically the bias force used would also be sufficient to substantially prevent tilting of the mouse tray away from the neutral position when the mouse is resting on any portion of the top surface of the mouse tray. Thus the mouse can be left on the mouse tray without sliding off.

It is contemplated that the bias force could be provided in a number of different ways. For example the mouse tray could be connected to the pylon by a resilient plastic or like material that allows the desired tilt, but also tends to move the tray to the neutral horizontal position. Described below is one embodiment of the apparatus 10 to illustrate the general principles of the present invention.

Figures 1, 2:
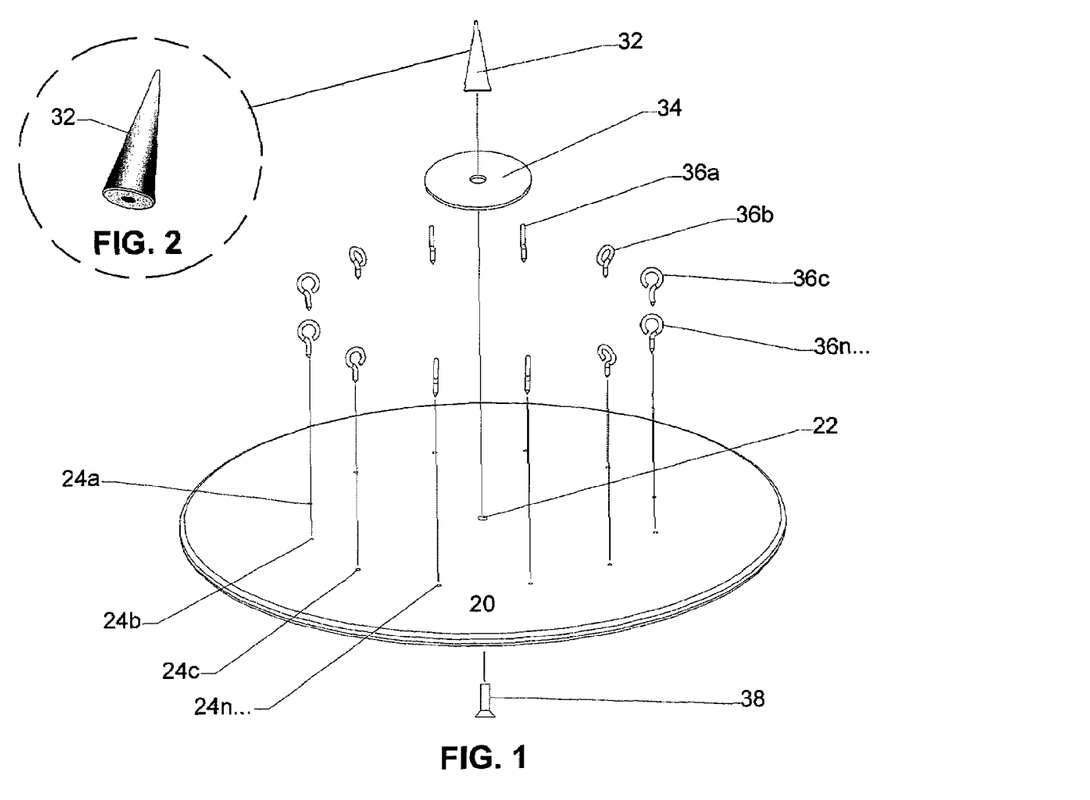
FIG. 1 is an exploded view illustrating the parts used for the assembly of the base of an embodiment of the mouse tray apparatus of the invention.
FIG. 2 is a blown up perspective view of the conical pylon of the base.
Figure 3:
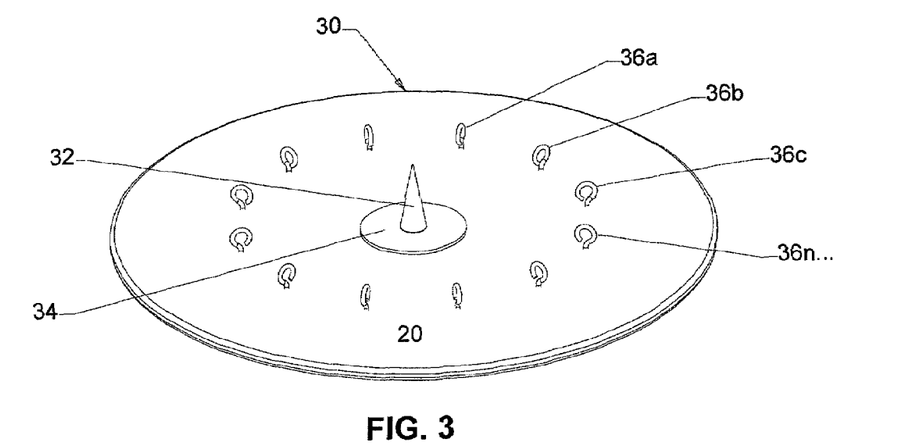
FIG. 3 is a perspective view of the assembled base.

Referring to FIG. 1, the base 30 of the present invention is constructed using base plate 20, which is circular in the preferred embodiment, but can be constructed using several shapes and sizes; a few possible variations are shown in FIG. 19-22. Base plate 20 should be wide enough to provide a stable base, unless the base will be firmly attached to a stable surface. The preferred embodiment and the variations shown in FIG. 19-22 are meant to illustrate possible examples but are not meant to limit the scope of possible variations, additional variations are possible and would be apparent to those skilled in the art.

Returning to FIG. 1, screw 38 is inserted through the bottom of base plate 20 in through-hole 22 and washer 34 is placed over screw 38 to stabilize a conical fixture illustrated as a conical pylon 32, which can be seen in a perspective view in FIG. 2. If base plate 20 is constructed in a sufficiently hard material, washer 34 may not be necessary. Conical pylon 32 is attached to screw 38. Other upward protruding members or different shaped pylons can be used in place of conical pylon 32, but the thin rounded point and stable base of the conical pylon is economical and well suited for the current application as will be discussed later. For example a ball and socket connection could be suitable in some applications, however would likely be more costly.

Eye screws 36$n$ are inserted in holes 24$n$ situated at the top of base plate 20 around through-hole 22. Holes 24$n$ are deep enough to support eye screws 36$n$ but do not go all the way through base plate 20. In the preferred embodiment, there are 12 eye screws 36$n$ but the number of eye screws can vary. The illustrated configuration has been found to provide satisfactory stability and smoothness of operation. These parts combine to form base 30 shown in FIG. 3.

Figure 4:
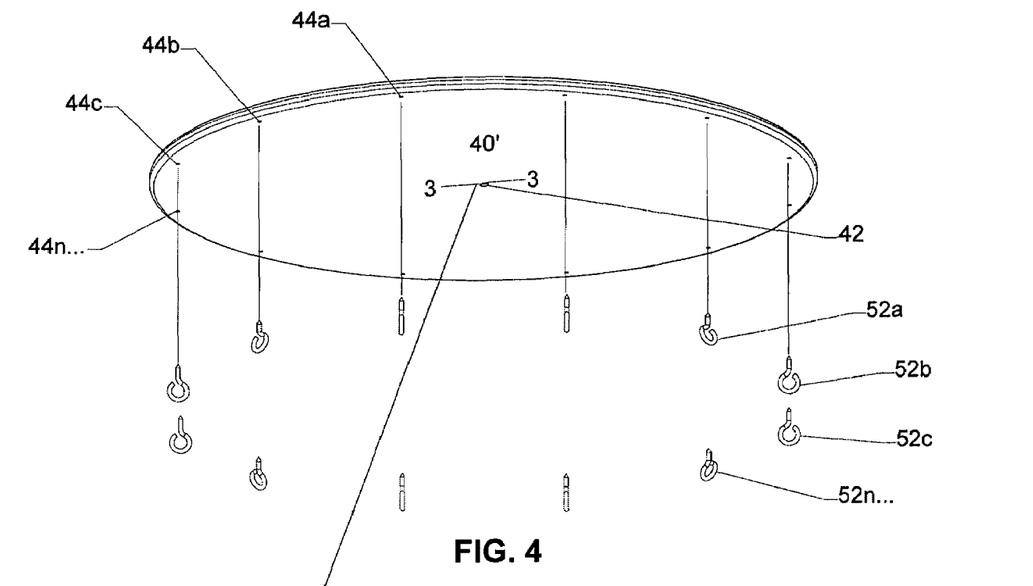
FIG. 4 is an exploded view illustrating the parts used for the assembly of the upper tray.

Referring to FIG. 4, mouse tray 40 of the present invention is conveniently circular. Other variations are possible, but a circular shape is easily manufactured and effectively accommodates the numerous angles of tilt, some of which are shown in FIG. 10-18. The size of mouse tray 40 can vary in respect to base plate 20, but in the preferred embodiment as displayed in FIG. 9, mouse tray 40 is slightly larger then base plate 20, thereby hiding base 30 when being viewed from above.

Figures 5, 6:
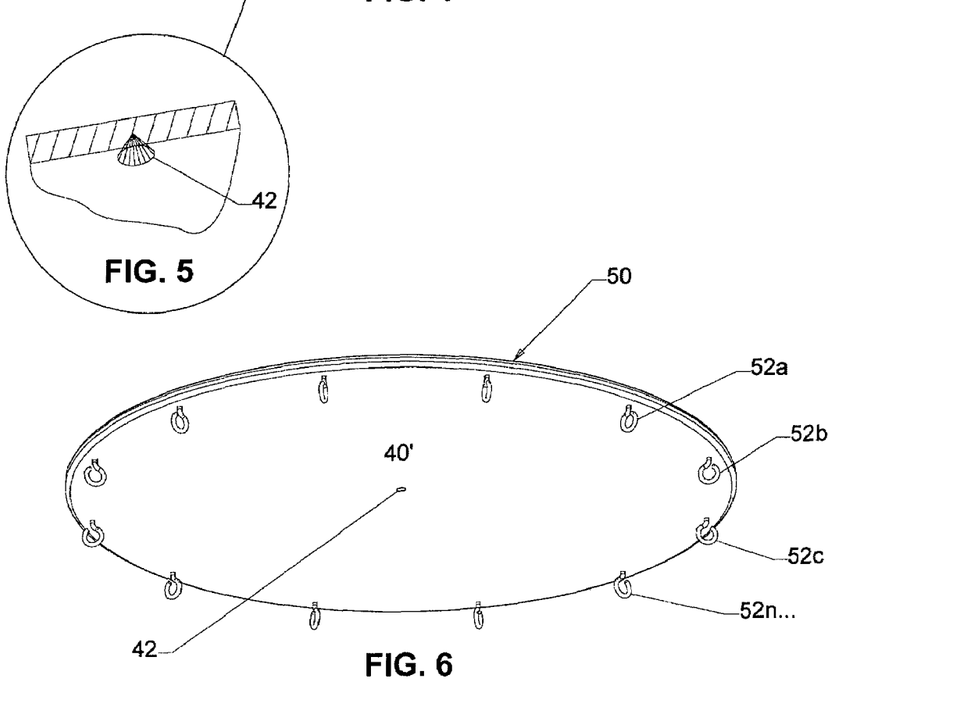
FIG. 5 is a blown up cross section view illustrating the shape and depth of the conical recess of the upper tray, taken along line 3-3 in FIG. 4.
FIG. 6 is a perspective view of the assembled upper tray.

Returning to FIG. 4, conical recess 42 goes part way through the bottom of the tray 40, shown in more detail in the cross section blow up in FIG. 5, taken from line 3-3 in FIG. 4.

The purpose of the conical shape of recess 42 is to accommodate conical pylon 32 of base 30 as will be discussed later. If an upward protruding member of a different shape were used in place of conical pylon 32, the shape of recess 42 would be adjusted accordingly. Eye screws 52n are inserted in holes 44n situated around conical recess 42 at the bottom 40' of the tray. Holes 44n are deep enough to support eye screws 52n but do not go all the way through mouse tray 40. The number of eye screws 52n should equal the number of eye screws 36n which are attached to base plate 20, but should be situated at a larger radius from conical recess 42, then the radius of eye screws 36n are from through hole 22 (see FIG. 1-2), the difference in radius being displayed in FIG. 8-9. The difference in radius allows elastic bias devices 54n shown in FIG. 7-9 to be long enough to offer sufficient resistance with a smaller percentage of stretch on the bias devices, thereby reducing tensile strain and prolonging the life of bias devices 54n. Mouse tray 40 and eye screws 52n combine to form upper tray member 50. Other devices could be used in place of eye screws, eye screw are used for illustrative purposes.

Figure 7:
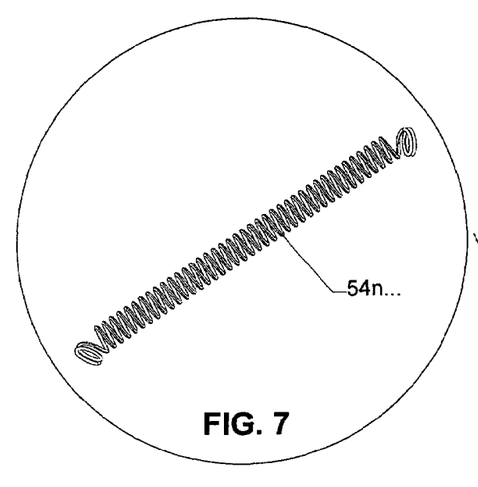
FIG. 7 is a blown up view of the metal spring used to attach the upper tray to the base.
Figure 8:
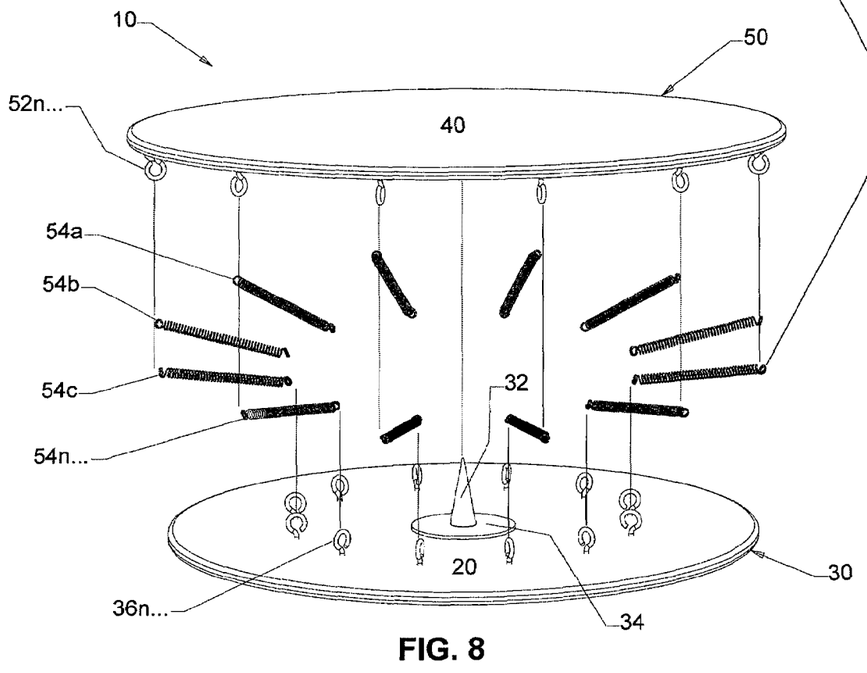
FIG. 8 is an exploded view illustrating the assembly of the upper tray to the base joined by the metal springs.

Referring to FIG. 7-8, upper tray member 50 rests over conical pylon 32 aligned under conical recess 42 (conical recess not shown in FIG. 8, refer to FIG. 4-6). The purpose of conical recess 42 is to center conical pylon 32 under upper tray member 50, the angle of the point of conical recess 42 should be larger than the angle of the point of conical pylon 32 so that it doesn't impede the tilting of tray member 50. The thin rounded point of conical pylon 32 is ideal for the present invention because it allows for a small surface contact area with upper tray member 50, thereby providing smoother movement by reducing the friction between tray member 50 and conical pylon 32. Bias devices 54n attach with one end to eye screws 36n, while the other end is attached to eye screws 52n. Bias devices 54n are provided in the illustrated embodiment by metal springs for strength and durability, but other elastic or resilient bias devices could alternatively be used.

Figure 9:
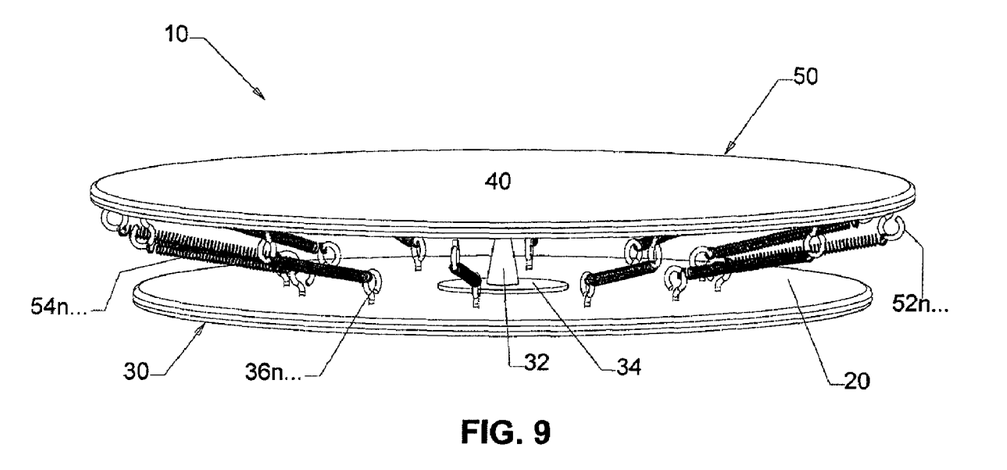
FIG. 9 is a perspective view of the fully assembled tray apparatus.

All parts combined comprise the apparatus 10 of the present invention displayed in FIG. 9. A mouse or other similar input device is placed on the top of mouse tray 40 and as the user moves the input device across the tray, the adjacent section of tray 40 tilts downwardly under the weight of the user's hand, while metal springs 54n exert a bias force to prevent mouse tray 40 from tilting too far and coming in contact with base 30. Metal springs 54n return tray 40 to the neutral, substantially horizontal, position displayed in FIGS. 9 and 18 when the mouse is slid across the fixed point directly above conical pylon 32, or when the user's hand is lifted off the input device, the springs being strong enough to hold the tray 40 in the neutral position under the weight of the mouse alone.

Figure 10:
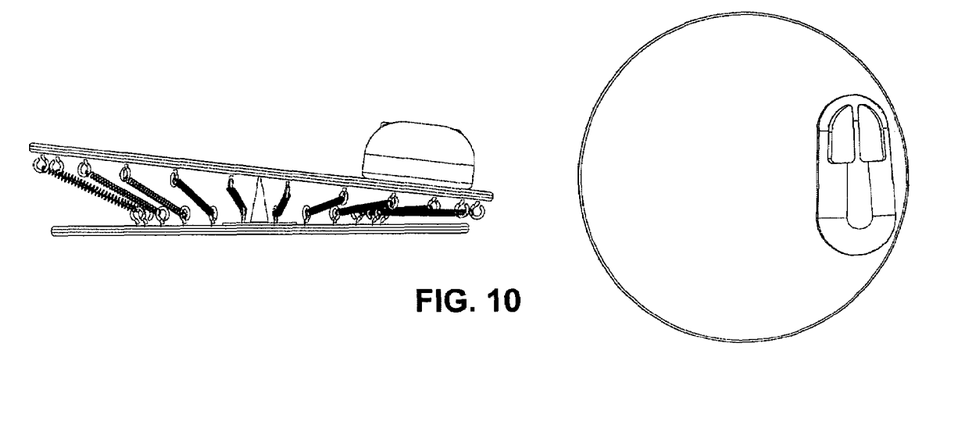
FIG. 10 is a rear view of the tray shown tilting right, and schematically indicating the corresponding location of the mouse on the tray that would cause the illustrated tilt.
Figure 11:
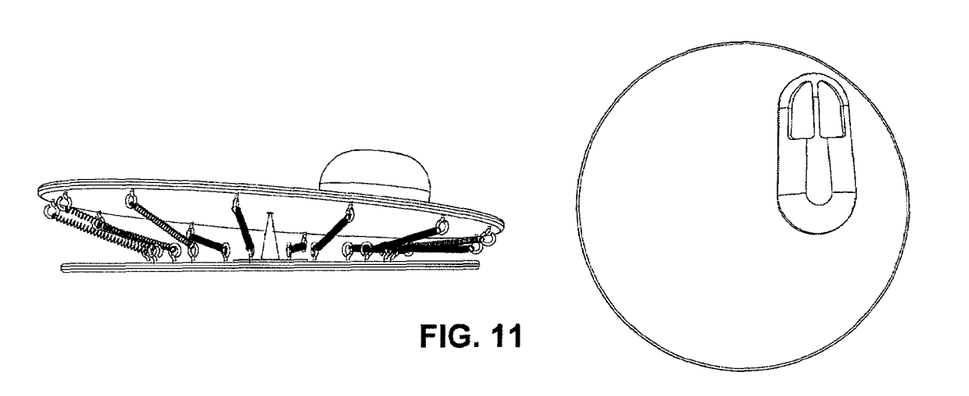
FIG. 11 is a rear view of the tray shown tilting forward-right, and schematically indicating the corresponding location of the mouse on the tray that would cause the illustrated tilt.
Figure 12:
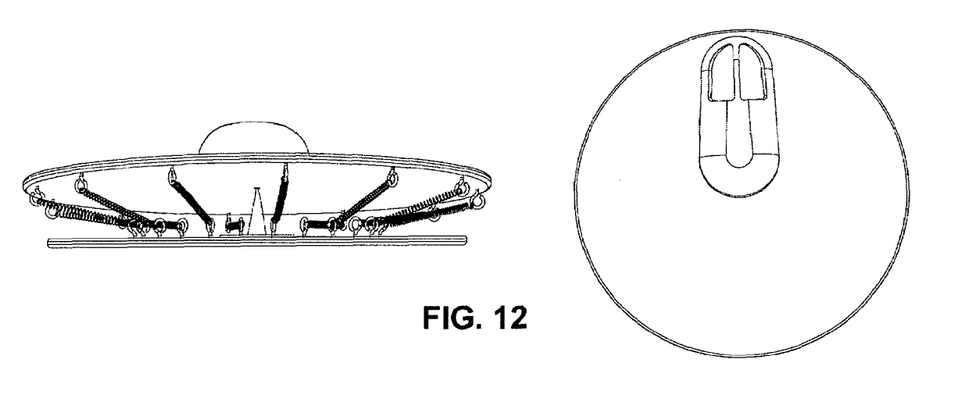
FIG. 12 is a rear view of the tray shown tilting forward, and schematically indicating the corresponding location of the mouse on the tray that would cause the illustrated tilt.
Figure 13:
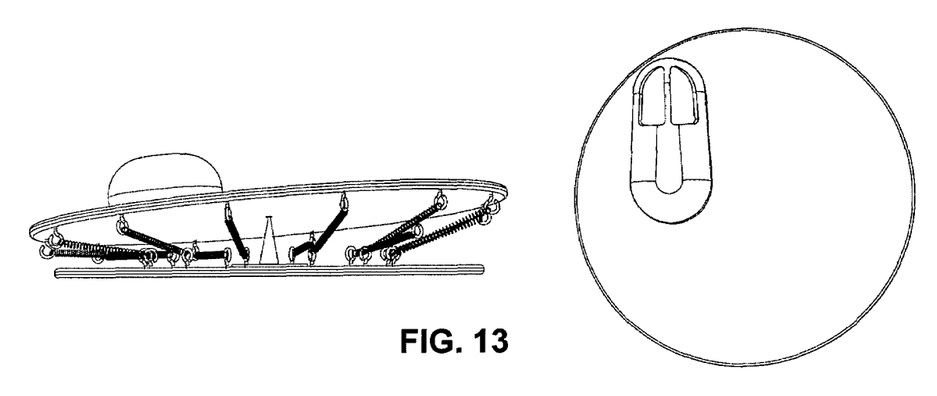
FIG. 13 is a rear view of the tray shown tilting forward-left, and schematically indicating the corresponding location of the mouse on the tray that would cause the illustrated tilt.
Figure 14:
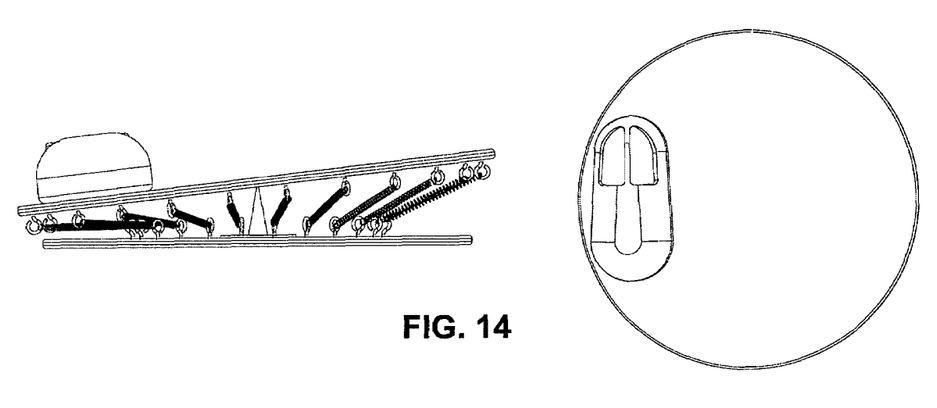
FIG. 14 is a rear view of the tray shown tilting left, and schematically indicating the corresponding location of the mouse on the tray that would cause the illustrated tilt.
Figure 15:
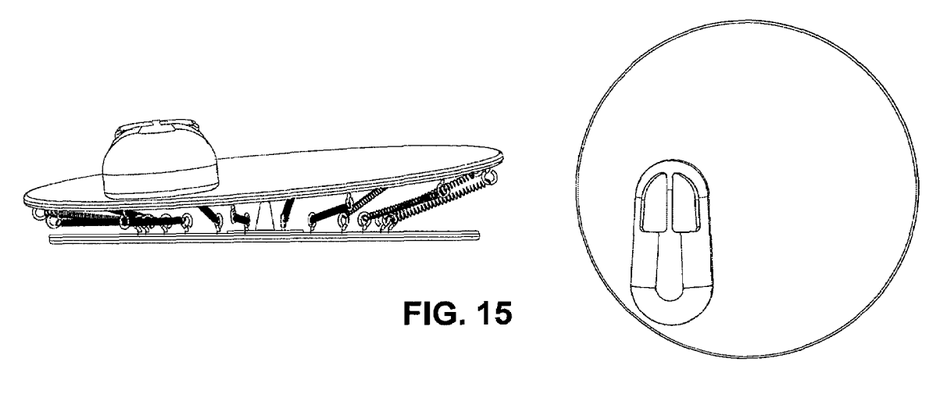
FIG. 15 is a rear view of the tray shown tilting rearward-left, and schematically indicating the corresponding location of the mouse on the tray that would cause the illustrated tilt.
Figure 16:
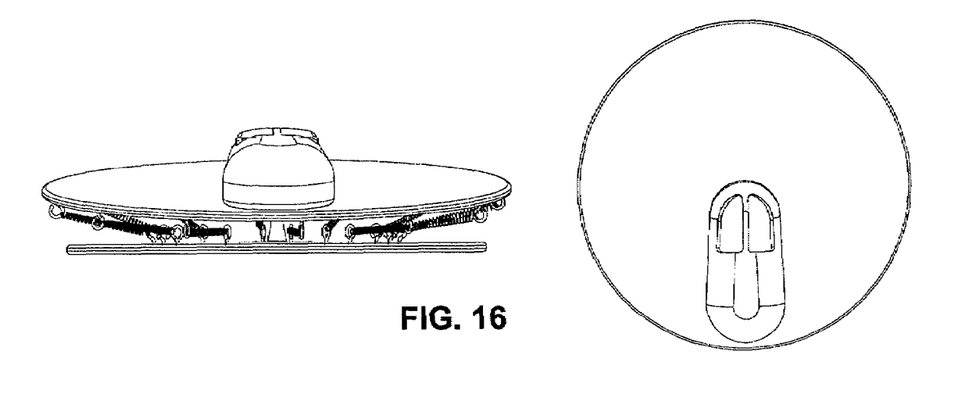
FIG. 16 is a rear view of the tray shown tilting rearward, and schematically indicating the corresponding location of the mouse on the tray that would cause the illustrated tilt.
Figure 17:
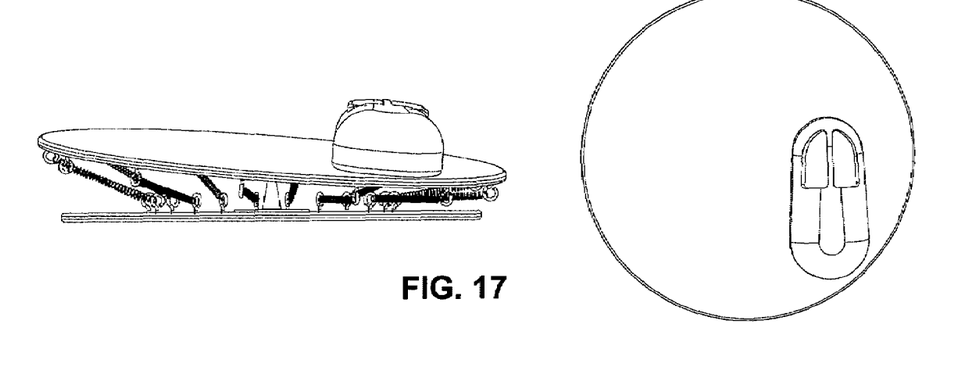
FIG. 17 is a rear view of the tray shown tilting rearward-right, and schematically indicating the corresponding location of the mouse on the tray that would cause the illustrated tilt.
Figure 18:
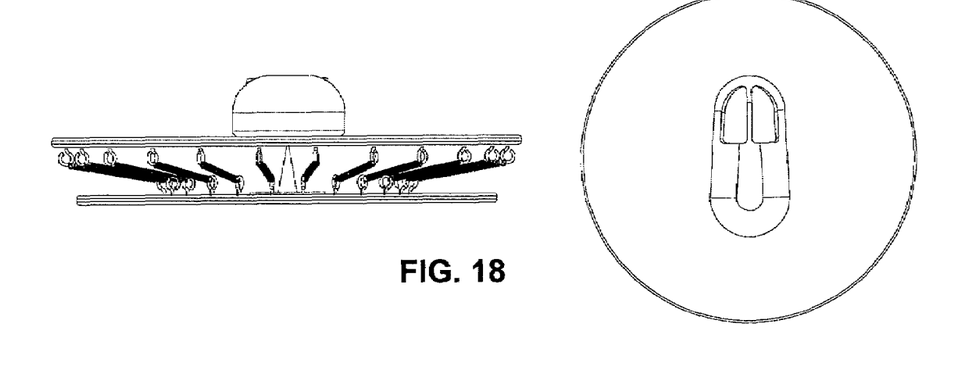
FIG. 18 is a rear view of the tray shown in the neutral (horizontal) position, and schematically indicating the corresponding location of the mouse on the tray that would cause the illustrated tilt.

The operation of the illustrated embodiment is shown in FIG. 10-18, the apparatus being viewed from both the rear and the top. A mouse is used in the figures to illustrate the interaction of an input device with the apparatus of the invention. The user's hand has been omitted from FIG. 10-18 to better display the function of the invention but as mentioned above, the upper mouse tray and springs are configured so that the mouse tray will not tilt under the weight of the input device alone without the additional weight of the hand. The upper tray tilts in all directions while in use, some of which are displayed in the following drawings: FIG. 10 (right), FIG. 11 (forward-right), FIG. 12 (forward), FIG. 13 (forward-left), FIG. 14 (left), FIG. 15 (rearward-left), FIG. 16 (rearward), FIG. 17 (rearward-right), FIG. 18 (neutral). The constant tilting of the upper tray causes the wrist to continually be in motion, thereby exercising the various ranges and axes of the wrist, reducing injuries related to stiffness and lack of movement. The constant movement of the muscles and tendons also promotes circulation in the wrist and hand.

With the mouse tray 40 pivotally mounted to the base 30 at a bottom mid-portion thereof that is about in the center of the mouse tray 40 as illustrated, the tray 40 and thus the user's hand will tilt down to the right and left and forward and rearward as the mouse moves over the surface of the mouse tray 40 providing a wide range of movements. If the mid-portion where the tray 40 is attached is located more to one side or to the front or rear, the range of movement will be reduced somewhat as the downward force of the hand will tilt the tray 40 only when between the attachment point to the base, for example at the top end of the pylon 32, and the edge of the tray 40.

Figure 19:
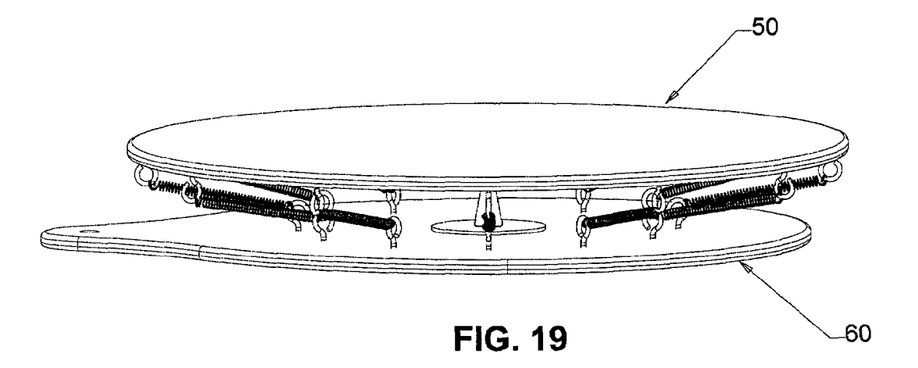
FIG. 19 is a perspective view of an alternate embodiment of the invention with a base plate designed to attach to a keyboard platform or other surface.
Figure 20:
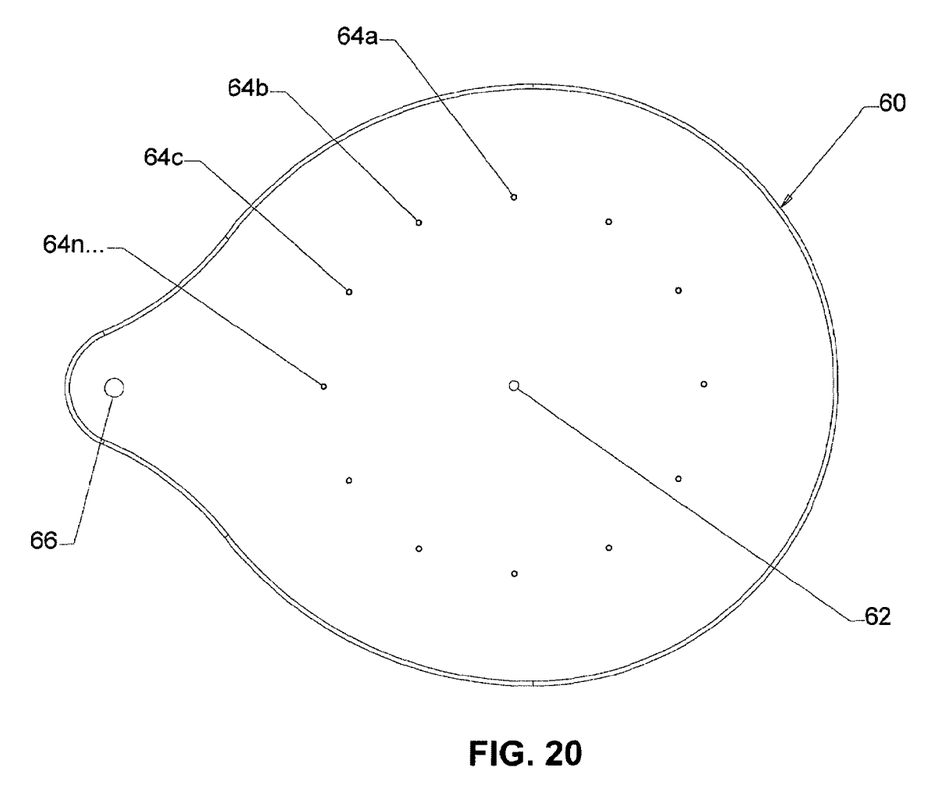
FIG. 20 is a plan view of the base plate in FIG. 19.

Two of many possible variations to the present invention are shown in FIG. 19-22. Base plate 60 in FIG. 19-20 is similar to base plate 20 of the preferred embodiment shown in FIG. 1; through-hole 62 and holes 64n are constructed in the same manner as holes 22 and 24n respectively. What differs in base plate 60 is that it has an extension at one end with hole 66 that is used to attach base plate 60 to a keyboard platform or other surface, allowing the invention to be swiveled to the user's desired position. If base plate 60 is attached to a keyboard platform that tilts, a tilting mechanism should be used that allows the present invention to tilt independently of the keyboard tray. The tilting mechanism should be attached with one end to hole 66 of base plate 60 and the other end to the keyboard platform, so that the tilt of the present invention could be offset from the tilt of the keyboard platform, ensuring that upper tray member 50 is substantially horizontal when in the neutral position (see FIG. 18).

Figure 21:
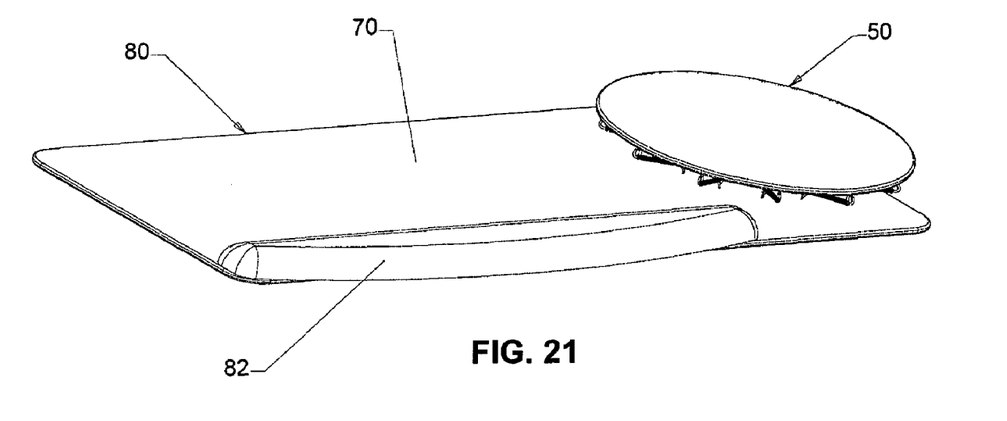
FIG. 21 is a perspective view of a variation of the invention with a base designed to hold a computer keyboard and optionally a wrist pad.
Figure 22:
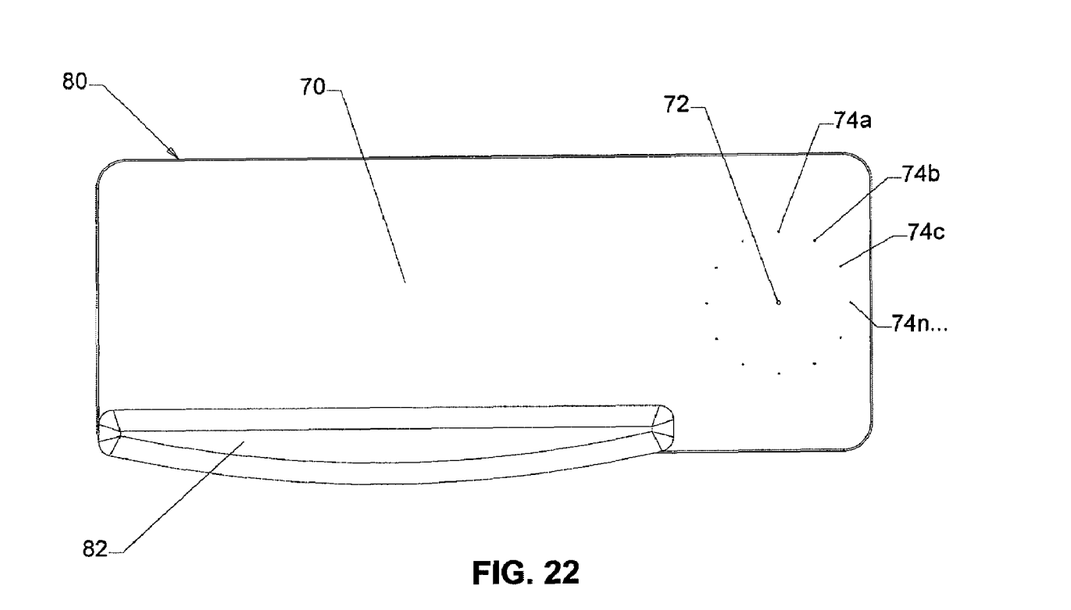
FIG. 22 is a plan view of the base plate in FIG. 21.

The other variation shown in FIG. 21-22 is a base that is also used as a keyboard platform. Base assembly 80 is comprised of tray 70 with through-hole 72 and holes 74n which are constructed in the same manner as holes 22 and 24n respectively (see FIG. 1). The computer keyboard would be placed on the surface of tray 70, while a soft wrist pad 82 could optionally be attached to provide cushioning for the wrist while typing.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A mouse tray apparatus comprising:
    a substantially planar mouse tray pivotally mounted at a bottom mid-portion thereof to a base, and at least one bias element operative to exert a bias force that resists tilting of the mouse tray away from a substantially horizontal neutral position;
    a pylon extending upward from the baser and wherein a top end of the pylon pivotally engages a bottom of the mouse tray at a location substantially in a center of the mouse tray;
    wherein the bias force is such that as an operator moves a mouse over a top surface of the mouse tray, a weight of the operator's hand on the mouse overcomes the bias force and causes the mouse tray to tilt downward in a direction corresponding to a location of the mouse on the mouse tray.

2. The apparatus of claim 1 wherein the top end of the pylon is substantially conical and is configured to engage a recess in a bottom of the mouse tray.

3. The apparatus of claim 1 comprising a plurality of bias devices, each bias device attached at one end thereof to a bottom of the mouse tray and attached at an opposite end thereof to the base.

4. The apparatus of claim 3 wherein the bias devices are attached to the mouse tray at tray locations substantially evenly spaced around a periphery of the mouse tray, and are attached to the base at base locations substantially evenly spaced around the pylon.

5. The apparatus of claim 4 wherein the base locations are closer to the pylon than the tray locations, such that the bias devices slope downward and inward toward the pylon from the bottom of the mouse tray.

6. The apparatus of claim 4 wherein the bias devices are in tension, such that upward movement of any portion of the mouse tray relative to the base is resisted.

7. The apparatus of claim 1 wherein the bias force is sufficient to substantially prevent tilting of the mouse tray away from the neutral position when the mouse is resting on any portion of the top surface of the mouse tray.

8. A mouse tray apparatus comprising:
a substantially planar mouse tray pivotally mounted at a bottom mid-portion thereof to a base, and at least one bias element operative to exert a bias force that resists tilting of the mouse tray away from a substantially horizontal neutral position;
a tab extending laterally from the base, the tab adapted for pivotal connection to a keyboard platform;
wherein the bias force is such that as an operator moves a mouse over a top surface of the mouse tray, a weight of the operator's hand on the mouse overcomes the bias force and causes the mouse tray to tilt downward in a direction corresponding to a location of the mouse on the mouse tray.

9. The apparatus of claim 8 wherein the base is provided by a keyboard platform, wherein the mouse tray is pivotally attached above an end portion of the keyboard platform.

10. A mouse and mouse tray apparatus comprising:
a substantially planar mouse tray pivotally mounted at a bottom mid-portion thereof to a base;
a mouse;
at least one bias element operative to exert a bias force that resists tilting of the mouse tray away from a substantially horizontal neutral position;
wherein the bias element and mouse tray are configured such that as an operator moves—the mouse over a top surface of the mouse tray, a weight of the operator's hand on the mouse causes the mouse tray to tilt downward in a direction corresponding to a location of the mouse on the mouse tray.

11. The apparatus of claim 10 comprising a pylon extending upward from the base, and wherein a top end of the pylon pivotally engages a bottom of the mouse tray at a location substantially in a center of the mouse tray.

12. The apparatus of claim 11 wherein the top end of the pylon is substantially conical and is configured to engage a recess in a bottom of the mouse tray.

13. The apparatus of claim 10 wherein the mouse tray is biased to a substantially horizontal neutral position, and wherein the weight of the operator's hand on the mouse causes the tray to tilt.

14. The apparatus of claim 13 comprising a plurality of bias devices, each bias device attached at one end thereof to a bottom of the mouse tray and attached at an opposite end thereof to the base.

15. The apparatus of claim 14 wherein the bias devices are attached to the mouse tray at tray locations substantially evenly spaced around a periphery of the mouse tray, and are attached to the base at base locations substantially evenly spaced around the pylon.

16. The apparatus of claim 15 wherein the base locations are closer to the pylon than the tray locations, such that the bias devices slope downward and inward toward the pylon from the bottom of the mouse tray.

17. The apparatus of claim 15 wherein the bias devices are in tension, such that upward movement of any portion of the mouse tray relative to the base is resisted.

18. The apparatus of claim 13 wherein the mouse tray is biased by a bias force sufficient to substantially prevent tilting of the mouse tray away from the neutral position when the mouse is resting on any portion of the top surface of the mouse tray.

* * * * *

UNITED STATES PATENT AND TRADEMARK OFFICE
CERTIFICATE OF CORRECTION

PATENT NO. : 7,527,234 B2
APPLICATION NO. : 11/623527
DATED : May 5, 2009
INVENTOR(S) : Mark Simic It is certified that error appears in the above-identified patent and that said Letters Patent is hereby corrected as shown below:

On the title page, item [76]: Inventor: "Mark Simic, 882 Homer Avenue, Toronto, ON (CA) M6W 2C5" should be -- Mark Simic, 582 Horner Avenue, Toronto, ON (CA) M6W2C5 --

Signed and Sealed this

Fifteenth Day of September, 2009

David J. Kappos
*Director of the United States Patent and Trademark Office*

UNITED STATES PATENT AND TRADEMARK OFFICE
CERTIFICATE OF CORRECTION

PATENT NO.       : 7,527,234 B2
APPLICATION NO.  : 11/623527
DATED            : May 5, 2009
INVENTOR(S)      : Mark Simic It is certified that error appears in the above-identified patent and that said Letters Patent is hereby corrected as shown below:

On the title page item (76), "Mark Simic, 582 Homer Avenue, Toronto, ON (CA) M6W 2C5" should be -- Mark Simic, 582 Horner Avenue, Toronto, ON (CA) M8W 2C5 --

Signed and Sealed this

Tenth Day of November, 2009

David J. Kappos
*Director of the United States Patent and Trademark Office*